(12) United States Patent
Ishibashi et al.

(10) Patent No.: US 7,242,994 B2
(45) Date of Patent: Jul. 10, 2007

(54) METHOD AND SYSTEM OF PRODUCTION PLANNING

(75) Inventors: Hisaya Ishibashi, Kanagawa (JP); Noboru Takizawa, Kanagawa (JP); Chiharu Nakagome, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 6 days.

(21) Appl. No.: 11/317,030

(22) Filed: Dec. 22, 2005

(65) Prior Publication Data

US 2006/0142886 A1    Jun. 29, 2006

(30) Foreign Application Priority Data

Dec. 24, 2004   (JP)   ............................. 2004-373498

(51) Int. Cl.
    *G06F 19/00*   (2006.01)
(52) U.S. Cl. .................. 700/100; 700/97; 700/99; 700/108
(58) Field of Classification Search .............. 700/95, 700/96, 97, 99, 100, 103, 108, 111; 705/8, 705/22, 28
See application file for complete search history.

(56) References Cited

U.S. PATENT DOCUMENTS

| | | | |
|---|---|---|---|
| 7,039,481 B2 * | 5/2006 | Kawase et al. | 700/99 |
| 7,099,726 B2 * | 8/2006 | Kawase et al. | 700/100 |
| 7,136,825 B2 * | 11/2006 | Araki et al. | 700/111 |
| 2004/0158339 A1 * | 8/2004 | Kawase et al. | 700/97 |

FOREIGN PATENT DOCUMENTS

| | | |
|---|---|---|
| JP | 06-203037 | 7/1994 |
| JP | 11-282824 | 10/1999 |
| JP | 2000-067111 | 3/2000 |
| JP | 2002-244716 | 8/2002 |
| JP | 2003-150223 | 5/2003 |

* cited by examiner

*Primary Examiner*—Leo Picard
*Assistant Examiner*—Charles Kasenge
(74) *Attorney, Agent, or Firm*—Townsend and Townsend and Crew LLP; John Henkhaus

(57) ABSTRACT

Embodiments of the invention provide a computer-aided production planning method and system for accurately and quickly drafting a production plan for a given period for a production system employing a production line with a salvage process. In one embodiment, the method includes a new parts supply quantity recalculating step of recalculating the quantities $X_{i,j}$ of parts to be newly supplied based on obtained actual product yields $B_j$, actual production process total supply quantity ratios $C_{i,j}$, actual production process salvage ratios $D_{i,j}$, the requested quantities $A_j$ of finished products, and correction parameters $F_{i,j}$ for the actual production process total supply quantity ratios $C_{i,j}$; and a production process load determining step of, to draft a production plan for a given period, determining the load on each production process of the production line on each day based on the quantities $X_{i,j}$ of parts to be newly supplied in such a way that the requested quantities $A_j$ of finished products can be produced, the quantities $X_{i,j}$ being recalculated at the new parts supply quantity recalculating step.

14 Claims, 12 Drawing Sheets

Fig. 4

| PRODUCT NUMBER | REQUESTED DATE | SHIPPING QUANTITY (REQUESTED QUANTITY OF FINISHED PRODUCTS) $A_j$ |
|---|---|---|
| OA24931 | Oct. 1 | 1735 |
| OA24933 | Oct. 2 | 750 |
| OA24938 | Oct. 3 | 713 |
| OA24940 | Oct. 4 | 480 |

Fig. 5

| PRODUCT NUMBER | SALVAGE PROCESS (DISASSEMBLY PROCESS) | PROCESS | DATE | PROCESS SALVAGE RATIO $D_{i,j}$ |
|---|---|---|---|---|
| OA24931 | Salvage 1 | FINAL ASSEMBLY PROCESS | Oct. 1 | 0.45 |
| OA24933 | Salvage 1 | FINAL ASSEMBLY PROCESS | Oct. 2 | 0.35 |
| OA24938 | Salvage 1 | FINAL ASSEMBLY PROCESS | Oct. 3 | 0.40 |
| OA24940 | Salvage 1 | FINAL ASSEMBLY PROCESS | Oct. 4 | 0.45 |
| . | . | . | . | . |
| . | . | . | . | . |
| OA24931 | Salvage 1 | FINAL ASSEMBLY PROCESS | Oct. 1 | 0.10 |
| OA24933 | Salvage 1 | FINAL ASSEMBLY PROCESS | Oct. 2 | 0.20 |
| OA24938 | Salvage 1 | FINAL ASSEMBLY PROCESS | Oct. 3 | 0.13 |
| OA24940 | Salvage 1 | FINAL ASSEMBLY PROCESS | Oct. 4 | 0.10 |

Fig. 6

| PRODUCT NUMBER | DATE | YIELD $B_j$ |
|---|---|---|
| 0A24931 | Oct. 1 | 0.78 |
| 0A24933 | Oct. 2 | 0.48 |
| 0A24938 | Oct. 3 | 0.66 |
| 0A24940 | Oct. 4 | 0.80 |

Fig. 7

| PRODUCT NUMBER | PROCESS | DATE | PROCESS TOTAL SUPPLY QUANTITY RATIO $C_{i,j}$ |
|---|---|---|---|
| 0A24931 | FINAL INSPECTION PROCESS | Oct. 1 | 1.0 |
| 0A24931 | FINAL ASSEMBLY PROCESS | Oct. 1 | 0.9 |
| 0A24931 | SUBASSEMBLY INSPECTION TIME | Oct. 1 | 0.9 |
| 0A24931 | SUBASSEMBLY TIME | Oct. 1 | 0.9 |
| 0A24931 | PARTS INSPECTION PROCESS | Oct. 1 | 1.1 |
| 0A24931 | PARTS ASSEMBLY PROCESS | Oct. 1 | 1.1 |

Fig. 8

| PROCESS | DATE | AVAILABLE TIME FOR PRODUCTION $TH_{i,j}$ (SECONDS) |
|---|---|---|
| FINAL INSPECTION PROCESS | Oct. 1 | 28800 |
| FINAL ASSEMBLY PROCESS | Oct. 1 | 28800 |
| SUBASSEMBLY INSPECTION PROCESS | Oct. 1 | 21600 |
| SUBASSEMBLY PROCESS | Oct. 1 | 28800 |
| PARTS INSPECTION PROCESS | Oct. 1 | 36000 |
| PARTS ASSEMBLY PROCESS | Oct. 1 | 36000 |

METHOD AND SYSTEM OF PRODUCTION PLANNING

CROSS-REFERENCES TO RELATED APPLICATIONS

This application claims priority from Japanese Patent Application No. JP2004-373498, filed Dec. 24, 2004, the entire disclosure of which is incorporated herein by reference.

BACKGROUND OF THE INVENTION

The present invention relates to a computer-aided production planning method and system for drafting a production plan for a given period for a production line including a plurality of production processes and a salvage process (or disassembly process).

The following procedure is generally used to carry out production planning for a production system employing a production line with a salvage process. First, (1) a plan is drafted. Then, (2) the process load is determined through simulation. If there is a problem with the drafted plan, the plan is modified and step (2) is repeated.

For example, Japanese Patent Laid-Open No. 11-282824 (Patent Document 1) discloses a technique which performs a backward simulation, that is, tracing back the process flow, for a production system employing a refabrication process in order to determine the equipment load.

Further, Japanese Patent Laid-Open No. 2002-244716 (Patent Document 2) discloses a production line capability evaluation system applied to a production system employing a refabrication process. This evaluation system can automatically detect a bottleneck in the production line and suggest a remedial measure together with the effect of the measure.

BRIEF SUMMARY OF THE INVENTION

However, as described above, production planning for a production system employing a production line with a salvage process is carried out in the following manner. First, (1) a plan is drafted. Then, (2) the process load is determined through simulation. If there is a problem with the drafted plan, the plan is modified and step (2) is repeated. Thus, in such production planning, a modification may need to be made to the originally drafted plan, resulting in an increase in the time required to draft an appropriate plan. This might lead to an inability to perform practical planning work. The above Patent Documents 1 and 2, however, take no account of this problem.

It is, therefore, a feature of the present invention to provide a computer-aided production planning method and system for accurately and quickly drafting a production plan for a given period for a production system employing a production line with a salvage process.

An aspect of the present invention provides a method and system for drafting a production plan for a production line for a given period by use of a computer, the production line including a plurality of production processes and a salvage process, the salvage process disassembling products found to be defective in the production processes and returning salvaged parts to the production processes. The method comprises: an information collecting step of collecting yield information $B_j$ on products previously produced by the production line on each day j and obtaining an actual total supply quantity ratio $C_{i,j}$ and an actual salvage ratio $D_{i,j}$ for each production process i on each day j, the yield information $B_j$, the actual total supply quantity ratio $C_{i,j}$, and the actual salvage ratio $D_{i,j}$ being used to establish a salvage process calculation model; a new parts supply quantity recalculating step of recalculating the quantity $X_{i,j}$ of parts to be newly supplied to each production process i on each day j based on the product yield information $B_j$ on each day j, the actual total supply quantity ratio $C_{i,j}$ for each production process i on each day j, the actual salvage ratio $D_{i,j}$ for each production process i on each day j, the requested quantity $A_j$ of finished products on each day j, and a correction parameter $F_{i,j}$ for the actual total supply quantity ratio $C_{i,j}$ for each production process i on each day j, the product yield information $B_j$, the actual total supply quantity ratio $C_{i,j}$, and the actual salvage ratio $D_{i,j}$ being obtained at the information collecting step; and a production process load determining step of, to draft the production plan for the given period, determining the load on each production process of the production line based on the quantity $X_{i,j}$ of parts to be newly supplied to each process i on each day j in such a way that the requested quantity $A_j$ of finished products can be produced on each day j, the quantity $X_{i,j}$ being recalculated at the new parts supply quantity recalculating step.

Another aspect of the present invention provides a method and system for drafting a production plan for a production line for a given period by use of a computer, the production line including a plurality of production processes and a salvage process, the salvage process disassembling products found to be defective in the production processes and returning salvaged parts to the production processes. The method comprises: an information collecting step of collecting yield information $B_j$ on products previously produced by the production line on each day j and obtaining an actual total supply quantity ratio $C_{i,j}$ and an actual salvage ratio $D_{i,j}$ for each production process i on each day j, the yield information $B_j$, the actual total supply quantity ratio $C_{i,j}$, and the actual salvage ratio $D_{i,j}$ being used to establish a salvage process calculation model; a correction parameter calculating step of calculating a correction parameter $f_{i,j}$ for the actual total supply quantity ratio $C_{i,j}$ for each production process i for each day j in such a way that the requested quantity $A_j$ of finished products can be produced by the production line on each day j and furthermore an appropriate quantity $OW_{i,j}$ of stock can be obtained for each production process i on each day j, the actual total supply quantity ratio $C_{i,j}$ being obtained at the information collecting step; a new parts supply quantity recalculating step of recalculating the quantity $X_{i,j}$ of parts to be newly supplied to each production process i on each day j based on the product yield information $B_j$ on each day j, the actual total supply quantity ratio $C_{i,j}$ for each production process i on each day j, the actual salvage ratio $D_{i,j}$ for each production process i on each day j, the requested quantity $A_j$ of finished products on each day j, and a correction parameter $F_{i,j}$ for each production process i on each day j obtained from the correction parameter $f_{i,j}$ for each production process i on each day j calculated at the correction parameter calculating step, the product yield information $B_j$, the actual total supply quantity ratio $C_{i,j}$, and the actual salvage ratio $D_{i,j}$ being obtained at the information collecting step, the correction parameter $F_{i,j}$ being set between upper and lower limit values; and a production process load determining step of, to draft the production plan for the given period, determining the load on each production process of the production line based on the quantity $X_{i,j}$ of parts to be newly supplied to each production process i on each day j in such a way that the requested quantity $A_j$ of finished products can be produced on each day j, the quantity $X_{i,j}$ being recalculated at the new parts supply quantity recalculating step.

Still another aspect of the present invention provides a method and system for drafting a production plan for a production line for a given period by use of a computer, the production line including a plurality of production processes and a salvage process, the salvage process disassembling products found to be defective in the production processes and returning salvaged parts to the production processes. The method comprises an information collecting step of collecting yield information $B_j$ on products previously produced by the production line on each day j and obtaining an actual total supply quantity ratio $C_{i,j}$ and an actual salvage ratio $D_{i,j}$ for each production process i on each day j, the yield information $B_j$, the actual total supply quantity ratio $C_{i,j}$ and the actual salvage ratio $D_{i,j}$ being used to establish a salvage process calculation model; a correction parameter calculating step of calculating a correction parameter $f_{i,j}$ for the actual total supply quantity ratio $C_{i,j}$ for each production process i for each day j in such a way that the requested quantity $A_j$ of finished products can be produced by the production line on each day j and furthermore an appropriate quantity $OW_{i,j}$ of stock can be obtained for each production process i on each day j, the actual total supply quantity ratio $C_{i,j}$ being obtained at the information collecting step; a correction parameter setting step of setting the correction parameter $f_{i,j}$ at between upper and lower limit values, the correction parameter $f_{i,j}$ being calculated for each production process i for each day j at the correction parameter calculating step; a new parts supply quantity recalculating step of, in accordance with the equation (formula (1)), $$X_{i,j}=((F_{i,j}*C_{i,j})-((1-B_j)*D_{i,j}))*(A_j/B_j) \quad (1)$$

recalculating the quantity $X_{i,j}$ of parts to be newly supplied to each production process i on each day j based on the product yield information $B_j$ on each day j, the actual total supply quantity ratio $C_{i,j}$ for each production process i on each day j, the actual salvage ratio $D_{i,j}$ for each production process i on each day j, the requested quantity $A_j$ of finished products on each day j, and a correction parameter $F_{i,j}$ for each production process i on each day j obtained from the correction parameter $f_{i,j}$ for each production process i on each day j set at the correction parameter setting step, the product yield information $B_j$, the actual total supply quantity ratio $C_{i,j}$, and the actual salvage ratio $D_{i,j}$ being obtained at the information collecting step, the correction parameter $F_{i,j}$ being set between the upper and lower limit values; and a production process load determining step of, to draft the production plan for the given period, determining the load on each production process of the production line based on the quantity $X_{i,j}$ of parts to be newly supplied to each process i on each day j, the quantity $X_{i,j}$ being recalculated at the new parts supply quantity recalculating step.

According to yet another aspect of the present invention, the production process load determining step includes: if there is a production process that creates a bottleneck in the production line, determining the quantity of products producible on each day j when the bottleneck production process is used; determining the quantity of parts to be newly supplied to each production process i on each day j based on the determined quantity of products producible on each day j; and determining the load on each production process of the production line based on the determined quantity of parts to be newly supplied to each production process i on each day j.

According to still a further aspect of the present invention, the correction parameter calculating step includes: tentatively determining the quantity $x_{i,j}$ of parts to be newly supplied to each production process i on each day j in such a way that the appropriate quantity $OW_{i,j}$ of stock can be obtained for each process i on each day j; and calculating the correction parameter $f_{i,j}$ for each production process i for each day j based on the tentatively determined quantity $x_{i,j}$ of parts to be newly supplied to each production process i on each day j in accordance with the following equation (formula (2)).

$$f_{i,j}=(1/C_{i,j})*(((1-B_j)*D_{i,j})+(x_{i,j}*(B_j/A_j))) \quad (2)$$

Thus, the present invention is applied to a production system employing a production line with a salvage process (disassembly system). The present invention can properly calculate the equipment load and thereby accurately simulate the actual production line, allowing a production plan to be accurately and quickly drafted.

BRIEF DESCRIPTION OF THE DRAWINGS

FIG. 4 is a diagram showing exemplary received order information obtained from the order-receiving system and stored in the received order information storage.

FIG. 5 is a diagram showing exemplary actual process salvage ratio information collected from the terminal of the salvage process, etc. and stored in the salvage ratio information storage.

FIG. 6 is a diagram showing exemplary actual product yield information collected from the terminal of the final inspection process, etc. and stored in the yield information storage.

FIG. 7 is a diagram showing exemplary actual process total supply quantity ratio information collected from the terminal of each process, etc. and stored in the process total supply quantity ratio information storage.

FIG. 8 is a diagram showing exemplary available-time-for-production information on each process obtained from the production line management system, etc. and stored in the available-time-for-production information storage.

DETAILED DESCRIPTION OF THE INVENTION

A description will be given of a production planning system according to an embodiment of the present invention with reference to the accompanying drawings.

Figure 1:
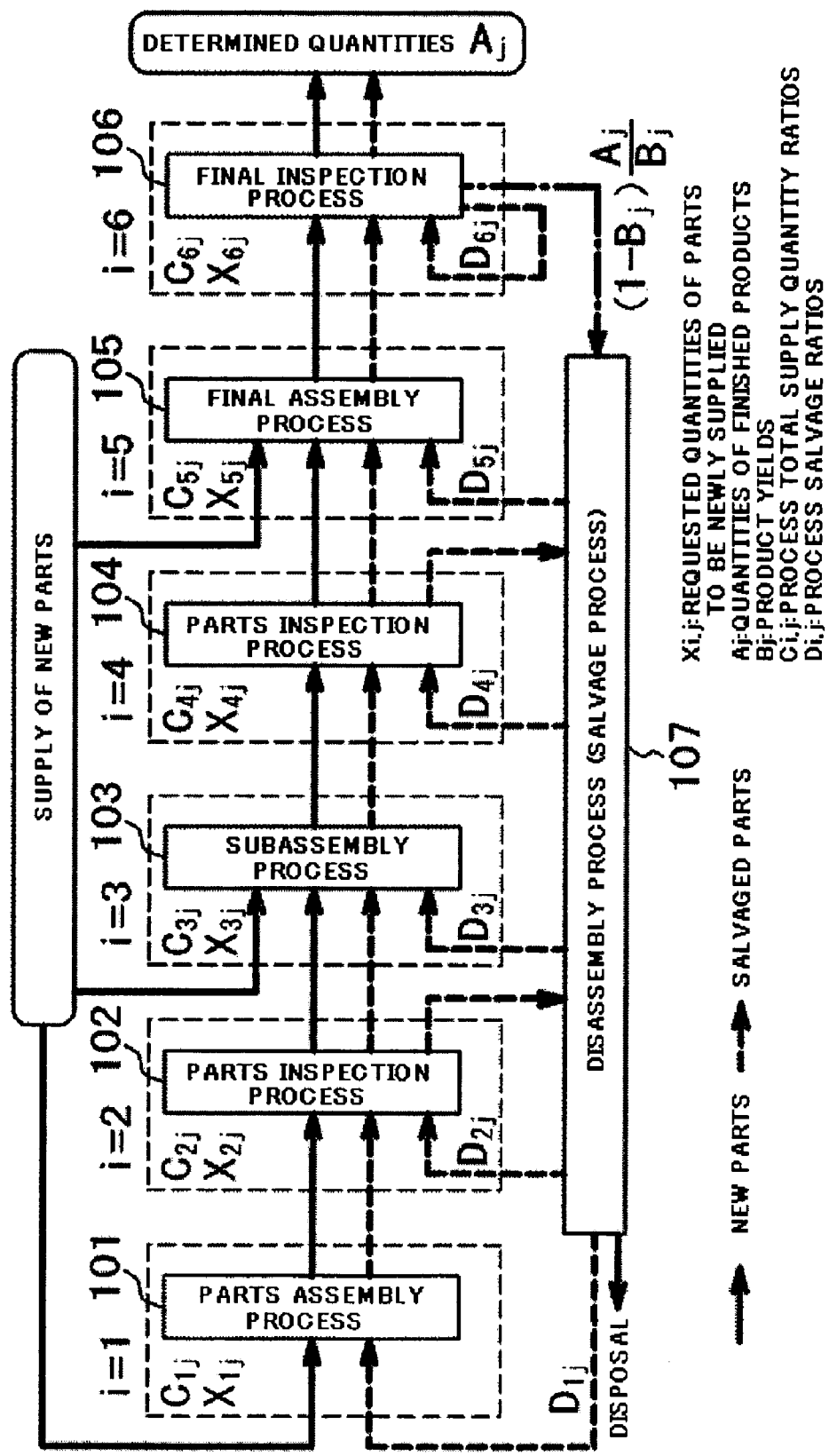
FIG. 1 is a simplified diagram showing the process flow of a production line employing a salvage process to which the present invention is applied.

FIG. 1 is a simplified diagram showing a product assembly process flow for a hard disk, etc., which is an exemplary manufacturing process flow to which a production planning system of the present invention is applied. An actual product assembly process flow (manufacturing process flow) may be made up of a number of processes including preliminary ones which join the primary processes. An actual disassembly process may also include a plurality of subprocesses. For example, the product assembly process flow for a hard disk, etc., exemplary manufacturing process flow to which the present invention is applied, is simplified as follows. The product assembly process flow includes a plurality of assembly processes, such as a parts assembly process 101, a subassembly process 103, and a final assembly process 105. These assembly and subassembly processes receive new parts as well as salvaged parts returned from a disassembly process 107. The product assembly process flow also includes: a parts inspection process 102 for determining whether each part is defective; a subassembly inspection process 104 for determining whether each subassembly is defective; and a final inspection process 106 for determining whether each finished product is defective. Each inspection process is made up of a plurality of subordinate inspection processes. The product assembly process flow still also includes a disassembly process (salvage process) 107 for disassembling each part, subassembly, or assembly (or a product) found to be defective in the inspection processes.

The parts assembly process 101 may be a process for assembling parts such as a magnetic head (not shown). The subassembly process 103 may be a process for mounting a magnetic disk drive mechanism (not shown) or a head moving mechanism (not shown) within the base portion (not shown) of the enclosure, for example. The magnetic disk drive mechanism rotates the magnetic disk, while the magnetic head moving mechanism moves the magnetic head over the magnetic disk. The final assembly process 105 may be a process for mounting the magnetic disk (not shown) on the magnetic disk drive mechanism, mounting the magnetic head (not shown) on the support member attached to the magnetic head moving mechanism, or attaching the cover portion of the enclosure onto the base portion of the enclosure.

The disassembly process (salvage process) 107 mainly disassembles products found to be defective in the final inspection process 106, which finally checks each product for defects. However, the disassembly process 107 also disassembles parts and subassemblies found to be defective in the parts inspection process 102 and the subassembly inspection process 104.

Thus, parts, subassemblies, and products disassembled in the disassembly process (salvage process) 107 are fed back to each assembly or subassembly process or inspection process as salvaged parts to be reused, depending on their defect. Even the parts that have been found to be defective in the final inspection process 106 and removed in the disassembly process 107 can be reused as salvaged parts, since they may be found to be nondefective when incorporated in or used in combination with a specific magnetic head, magnetic disk, and/or electronic circuit. It goes without saying that parts, subassemblies, etc. which cannot be reused are disposed of.

Figure 2:
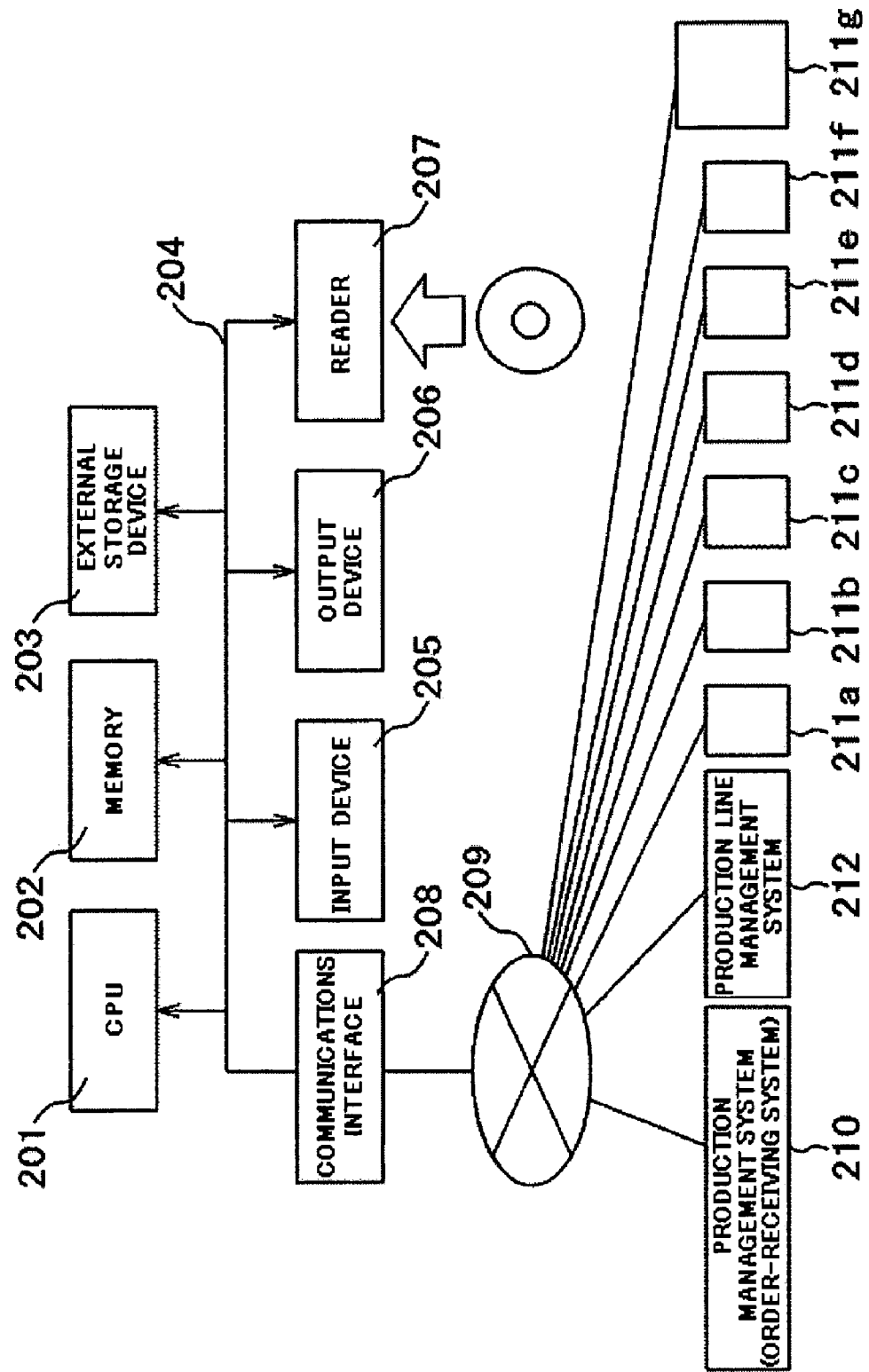
FIG. 2 is a diagram showing an exemplary hardware configuration of a production planning system according to the present invention.

A description will be given below of an exemplary hardware configuration of the production planning system according to the present invention with reference to FIG. 2. The production planning system according to the present invention may be implemented by a computer system having a general configuration, or a network system including a plurality of such computer systems. That is, as shown in FIG. 2, the production planning system comprises: a CPU 201 for performing various operations; memory 202; an external storage device 203; a reader 207 for reading data from a storage medium; an input device 205 such as a keyboard or a mouse, etc.; an output device 206 such as a display, etc.; a communications interface 208 for, through a network 209 such as the Internet, etc., communicating with an external production management system 210, for example an order-receiving system, etc., a production line management system 212, and terminals 211a to 211g provided for processes 101 to 107, respectively; and a bus 204 for connecting each device.

Figure 3:
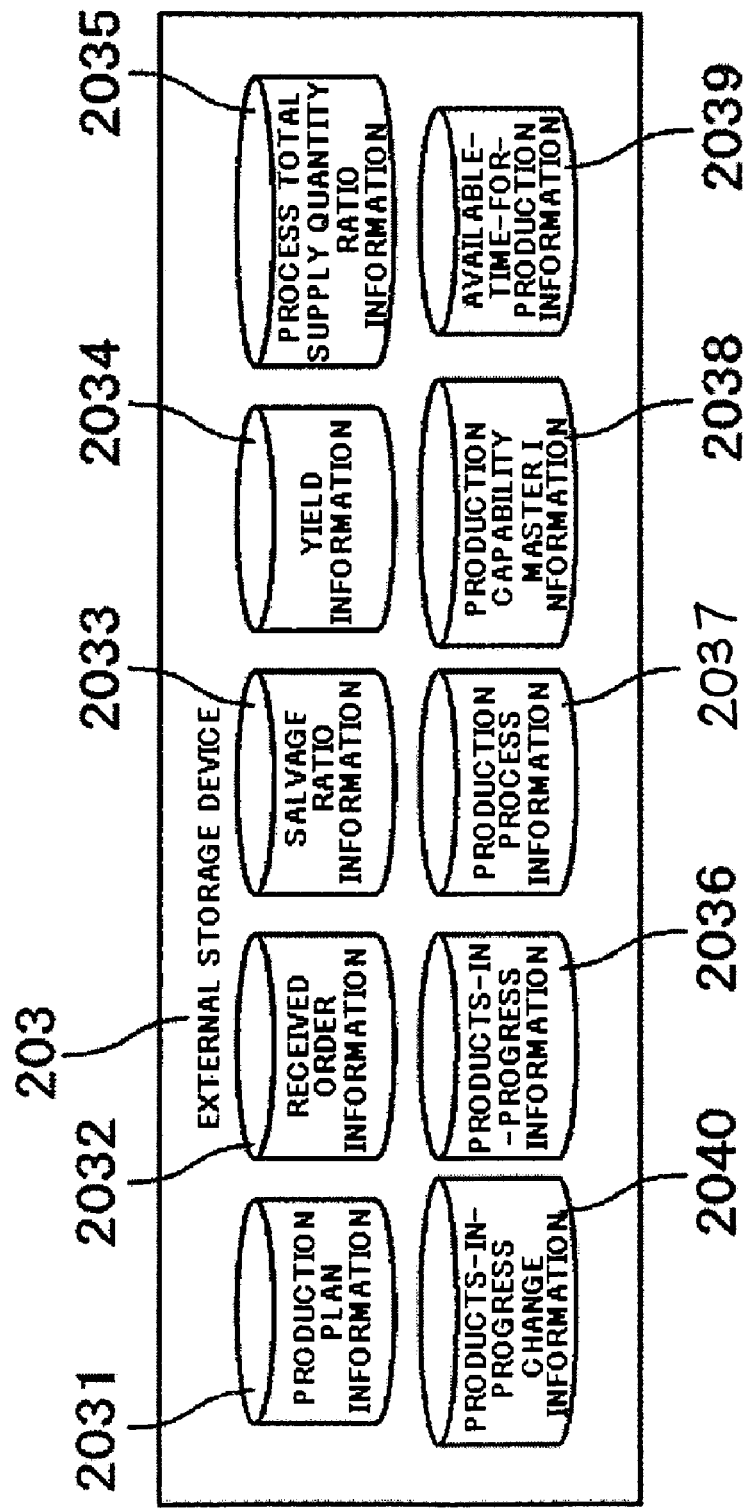
FIG. 3 is a diagram showing an external storage device which stores information for drafting a production plan as well as information on drafted production plans according to the present invention.

Further, for example, the external storage device 203 includes production plan information storage 2031, received order information storage 2032, salvage ratio information storage 2033, yield information storage 2034, process total supply quantity ratio information storage 2035, products-in-progress information storage 2036, production process information storage 2037, production capability master information storage 2038, available-time-for-production information storage 2039, and products-in-progress change information storage 2040, as shown in FIG. 3. The production plan information storage 2031 stores production plan information on the processes 101 to 106 created by the CPU 21, etc.; the received order information storage 2032 stores received order information (see FIG. 4) on orders received from customers each day (corresponding to the requested quantity $A_j$ of finished products, that is, the shipping quantity, on each day); the salvage ratio information storage 2033 stores process salvage ratio information $D_{i,j}$ (see FIG. 5), which indicates the proportion of salvaged parts returned from the disassembly process (salvage process) 107 to each process 101 to 106 on each day, and this information may be generated by collecting and averaging past actual salvage ratio information over a given length of time and updated at given intervals; the yield information storage 2034 stores yield information $B_j$ (see FIG. 6) on each day, and this information may be generated by collecting past actual yield information from the final inspection process 106 as final inspection results and averaging it over a given length of time and updated at given intervals; the process total supply quantity ratio information storage 2035 stores a total supply quantity ratio $C_{i,j}$ (see FIG. 7) for each process on each day, and this information may be generated by collecting and averaging past actual total supply quantity ratios over a given length of time and updated at given intervals; the products-in-progress information storage 2036 stores the initial quantity $W_{i,0}$ of products in progress (stock information) for each process, which is obtained from each of the terminals 211a to 211f provided for the processes 101 to 106, respectively, each time a production plan is drafted, and this data is used as initial stock data when the proper quantity $OW_{i,j}$ of stock for each process on each day is calculated); the production process information storage 2037 stores production process information (including a lead time required for each process) supplied from the production line management system 212 which manages each production line for each type of product through the network 209, and this information indicates which assembly and subassembly processes and inspection processes are used to produce each type of product; the production capability master information storage 2038 receives and stores production capability master information obtained from the production line management system 212 through the network 209, and this information indicates for each day the production time required for each process to assemble or inspect a single part, subassembly, or product, and is expressed in seconds per item; the available-time-for-production information storage 2039 stores available time for production (production capability time) for each process for each day (see FIG. 8), which is obtained from the above production line management system 212 through the network 209; and the products-in-progress change information storage 2040 stores products-in-progress change information, which indicates the quantity $W_{i,j}$ of products in progress for each process on each day calculated by the CPU 201 in accordance with formula (3) described later.

The received order information stored in the received order information storage 2032 is obtained from, for example, the production management system 210 (including an order-receiving system) through the Internet 209. As described above, the received order information indicates orders received from customers each day (corresponding to the requested quantity $A_j$ of finished products, that is, the shipping quantity for each day). As shown in FIG. 4, each record in the received order information includes: a product number field for storing a product number used to identify a final assembly type; a requested date field for storing a requested shipping date; and a shipping quantity field for storing the quantity of products to be shipped by the requested date.

The salvage ratio information $D_{i,j}$ for each process on each day stored in the salvage ratio information storage 2033 is obtained from, for example, the terminal 211g provided for the disassembly process 107 through the Internet 209. As described above, this information is generated by collecting and averaging past actual salvage ratios over a given length of time (e.g., 3 to 7 days) and is updated at given intervals (e.g., every three days). As shown in FIG. 5, each record in the salvage ratio information includes: a product number field for storing a product number used to identify a final assembly type; a salvage process field for storing a salvage process (disassembly process) name; a process field for storing information on a process to which a salvaged part is fed back from the inspection process; and a process salvage ratio field for storing a salvage ratio for the process, assuming the quantity of salvaged products in the final inspection process to be 1. It should be noted that when the salvage ratio for each process varies daily or with time, each record may include a date field for storing the date on which the salvage ratio in the process salvage ratio field is obtained.

The product yield information $B_j$ for each day stored in the yield information storage 2034 is obtained from, for example, the terminal 211f provided for the final inspection process 106 through the Internet 209. As described above, this information is generated by collecting and averaging past actual product yield information over a given length of time (e.g., one week) and is updated at given intervals (e.g., every three days). As shown in FIG. 6, each record in the product yield information includes: a product number field for storing a product number used to identify a final assembly type; and a yield field for storing a yield indicating the proportion of products found to be good in the final inspection process. It should be noted that when the yield varies daily or with time, each record may include a date field for storing the date on which the yield in the yield field is obtained as shown in FIG. 6.

The total supply quantity ratio $C_{i,j}$ for each process on each day stored in the process total supply quantity ratio information storage 2035 is obtained from, for example, the terminals 211a to 211e provided for the processes 101 to 105, respectively, through the Internet 209. As described above, this information is generated by collecting and averaging past actual total supply quantity ratio information over a given length of time (e.g., one week) and is updated at given intervals (e.g., every three days). The process total supply quantity ratio $C_{i,j}$ is the ratio of the total quantity of parts, the $C_{i,j}$ including newly supplied parts and salvaged parts, supplied to each process with respect to the total quantity of parts supplied to a specific reference process. The reference process for the process total supply quantity ratio is selected to be a process to which all newly supplied parts and salvaged parts (parts to be reused) are subjected, such as the final inspection process 106 shown in FIG. 1. As shown in FIG. 7, each record in the process total supply quantity ratio information includes: a product number field for storing a product number used to identify a final assembly type; a process field for storing a target process name; a date field for storing a date; and a process total supply quantity ratio field for storing the process total supply quantity ratio for the process on the date. It should be noted that the process total supply quantity ratios $C_{i,j}$ for some processes may be 1 or more even when the reference process is set to be the final inspection process 106, as shown in FIG. 1. The reason for this is that in these processes, a high proportion of the parts does not pass inspection and returned as salvaged parts.

The production capability master information $t_{i,j}$ on each process stored in the production capability master information storage 2038 is entered from, for example, the production line management system 212 through the Internet 209. As described above, this information indicates, for each day, the production time required for each process to assemble or inspect a single product (or part or subassembly). Each record in the production capability master information includes: a process field for storing a process name; a date field for storing a date; and a field for storing the time required for the process to produce a single product (or part or subassembly) on that date.

The available-time-for-production information (or production capability time information) $TH_{i,j}$ on each process for each day stored in the available-time-for-production information storage 2039 is entered from, for example, the production line management system 212 through the Internet 209. As shown in FIG. 8, each record in the available-time-for-production information includes: a process field for storing a process name; a date field for storing a date; and an available-time-for-production field for storing the time that the process can spend on production on that date.

The production process information stored in the production process information storage 2037 is entered through the Internet 209 from the production line management system 212, which manages the production line. As described above, this information indicates which assembly and subassembly processes and inspection processes are used to produce each type of product. Each record in the production process information includes: a product number field for storing a product number used to identify a final assembly type; a field for storing the names of the processes used to produce products or final assemblies of the product type indicated by the product number; and a field for storing the time (the lead time) that these processes spend on the production.

Figure 9:
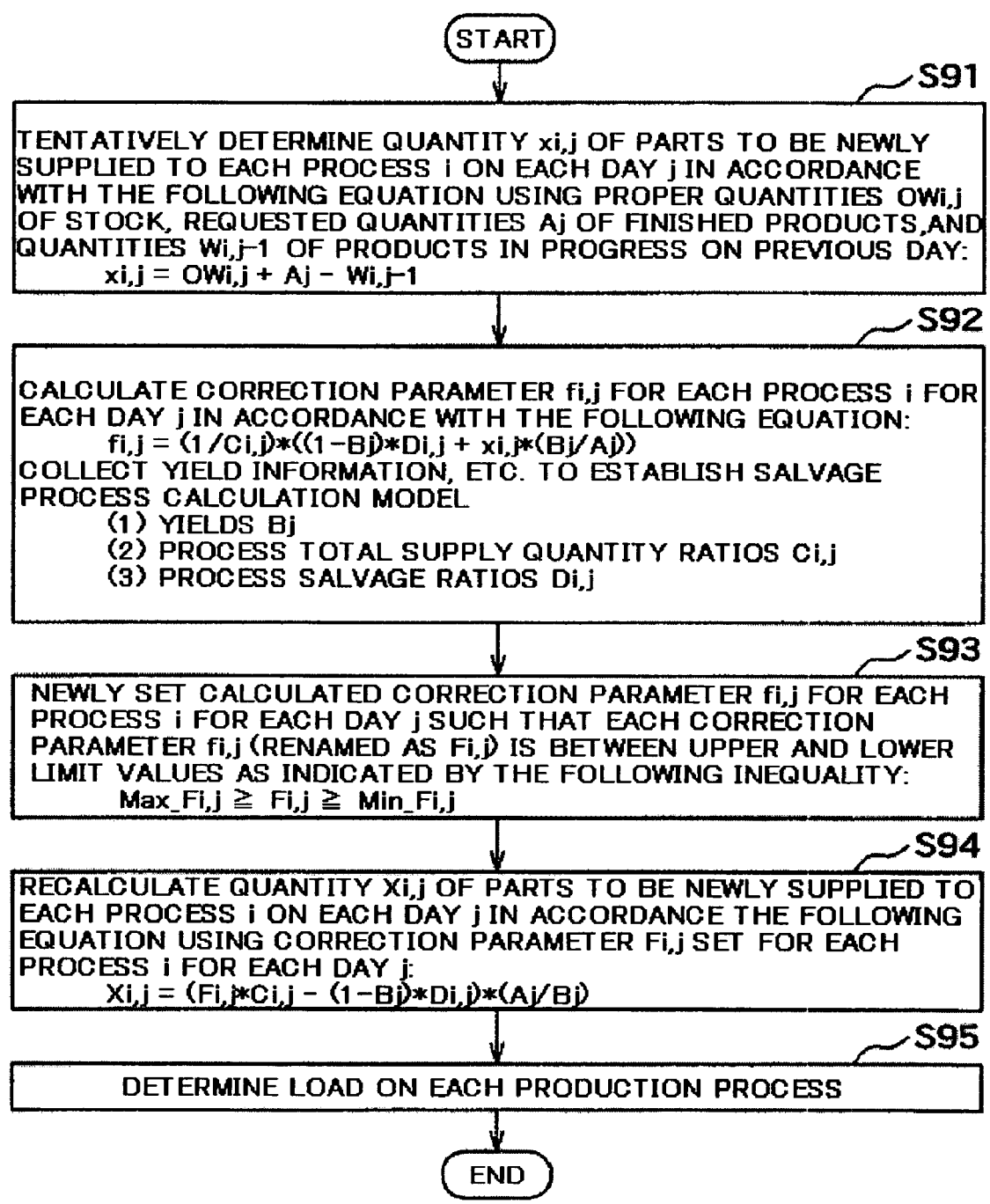
FIG. 9 is a diagram showing an exemplary process flow for drafting a production plan in the production planning system according to the present invention.

A description will be given below of the process flow in the production planning system shown in FIGS. 2 and 3 with reference to FIGS. 9 and 10. The present invention is applied to a production line employing a salvage process (or disassembly process), as described above. With such a production line, it is difficult to directly calculate the quantities of various parts to be supplied based on the required quantity of finished products, since parts found to be defective in the inspection processes are returned to the line as salvaged parts, this salvage operation may be repeated several times. Therefore, when drafting a production plan for a production line employing a salvage process (or disassembly process), the production planning system of the present invention shown in FIGS. 2 and 3 calculates the quantities $X_{i,j}$ of each type of part to be newly supplied to each process based on a salvage process calculation model using the process total supply quantity ratios $C_{i,j}$ and the process salvage ratio information $D_{i,j}$. Specifically, the production planning system calculates the quantity $X_{i,j}$ of each type of part to be newly supplied to process i on day j by use of the CPU 201 in accordance with formula (3) below at step S94 shown in FIG. 9. Process i is one of the plurality of assembly or subassembly processes, such as the parts assembly process 101, the subassembly process 103, or the final assembly process 105. (The above calculation is performed to take into account the lead time for each process preceding the final inspection process 106 on the production line.)

$$X_{i,j}=((F_{i,j}*C_{i,j})-((1-B_j)*D_{i,j}))*(A_j/B_j) \quad (3)$$

The total supply quantity ratio $C_{i,j}$ for process i on day j in the above salvage process calculation model is expressed as the ratio of the total quantity of parts, the $C_{i,j}$ including new and salvaged parts, supplied to process i on day j with respect to the total quantity of parts supplied to the final inspection process on day j. The process total supply quantity ratios $C_{i,j}$ are generated by collecting and averaging past actual total supply quantity ratios, the $c_{i,j}$ being obtained from the terminal provided for each process, over a given length of time. They are updated at given intervals and stored in the process total supply quantity ratio information storage 2035. The ratio $C_{i,j}$ being lower than 1.0 means that the parts yield of process i on day j is higher than the product yield $B_j$ of the final inspection process on day j; that is, only a small quantity of parts need to be supplied. On the other hand, the ratio $C_{i,j}$ being higher than 1.0 means that the parts yield of process i on day j is lower than the product yield $B_j$ of the final inspection process on day j, making it necessary to increase the quantity of parts to be supplied.

The process salvage ratio $D_{i,j}$ for process i on day j in the above salvage process calculation model is the ratio of the quantity of salvaged parts returned to process i on day j with respect to the quantity of parts (of the same type as the above salvaged parts) returned to the disassembly process 107 on day j. The above quantity of parts returned to the disassembly process 107 is expressed as: $(1-B_j)*(A_j/B_j)$. The process salvage ratios $D_{i,j}$ are generated by collecting and averaging past actual process salvage ratios, the $D_{i,j}$ being obtained from the terminal provided for each process, over a given length of time. They are updated at given intervals and stored in the salvage ratio information storage 2033.

Thus, the quantity of salvaged parts returned to each process on each day, expressed as $Y_{i,j}=(1-B_j)*(A_j/B_j)*D_{i,j}$, changes as the requested finished product quantity $A_j$ (or the received order quantity) and the product yield $B_j$ on each day change. Especially, with leading-edge devices, the quantity of salvaged parts returned to each process may change considerably, since the specifications of these devices have become more and more stringent.

To suppress a large change in the quantity $X_{i,j}$ of parts newly supplied to each process on each day due to such a change in the quantity $Y_{i,j}$ of salvaged parts returned to each process on each day, expressed as $Y_{i,j}=(1-B_j)*(A_j/B_j)*D_{i,j}$, the above formula (1) includes correction parameters $F_{i,j}$ for the process total supply ratios $C_{i,j}$. The correction parameters $F_{i,j}$ are each set to be between predetermined upper and lower limit values, preventing the quantities $X_{i,j}$ from being changed in an unrestricted manner.

Each time a production plan for a given period is drafted, the CPU 201 calculates the quantity $W_{i,j}$ of products in progress for each process for each day based on the initial quantity $W_{i,0}$ of products in progress, that is, the stock quantity, for each process stored in the products-in-progress information storage 2036 in accordance with formulas (4) below until the final process i and the last day j of the given period are reached. The CPU 201 then stores the calculated quantities $W_{i,j}$ in the products-in-progress change information storage 2040 as products-in-progress change information. Each record in the products-in-progress change information includes: a product number field for storing a product number used to identify a final assembly type; a process field for storing a process name; a date field for storing a date; and a field for storing the quantity of products in progress for the process on that day. Then, the CPU 201 may display the products-in-progress change information which is for the production plan for the given period and stored in the products-in-progress change information storage 2040, on the display 206, allowing the operator to check the estimated quantities of products in progress (stock conditions) for the product line.

$$W_{i,j-n}=W_{i,o}+x_{i,j-n}-A_{j-n},$$
$$W_{i,j-n+1}=W_{i,j-n}+x_{i,j-n+1}-A_{j-n+1}, \quad (4)$$
$$W_{i,j}=W_{i,j-1}+x_{i,j}-A_j$$

Figure 12:
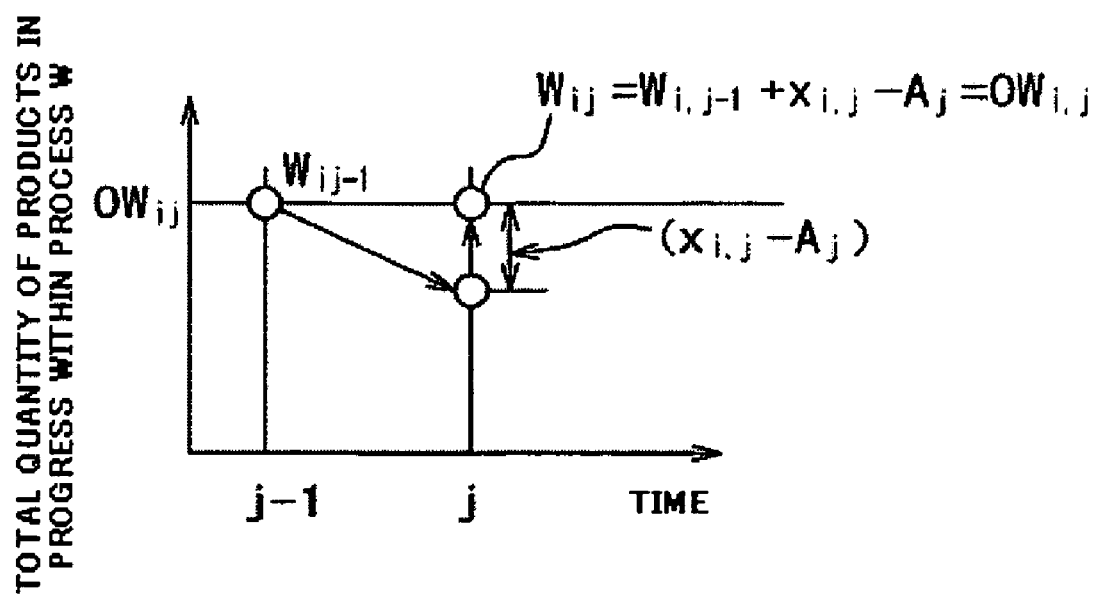
FIG. 12 is a diagram illustrating an example of how to tentatively determine the quantity of parts to be newly supplied according to the present invention.

Then, at step S91, the CPU 201 tentatively determines the quantity $x_{i,j}$ of parts to be newly supplied to each process i on each day j in accordance with formula (5) below using the proper quantities $OW_{i,j}$ of stock (the desired quantities of products in progress), the requested quantities of finished products $A_j$ obtained from the order-receiving system 210 and stored in the received order information storage 2032, and the quantities $W_{i,j-1}$ of products in progress on the previous day stored in the products-in-progress change information storage 2040 each time a production plan for a given period is drafted, as shown in FIG. 12. The determined quantities $x_{i,j}$ are stored in the products-in-progress change information storage 2040. That is, the present invention tentatively determines the quantities $x_{i,j}$ of parts to be newly supplied such that the quantities $W_{i,j}$ of products in progress, expressed as $W_{i,j}=W_{i,j-1}+x_{i,j}-A_j$, are equal to the corresponding proper quantities $OW_{i,j}$ of stock (the desired quantities of products in progress).

$$X_{i,j}=OW_{i,j}+A_j-W_{i,j-1} \quad (5)$$

Then, at step S92, the CPU 201 calculates the correction parameters $f_{i,j}$ for the process total quantity ratios $C_{i,j}$ in accordance with formula (6) below based on the quantity $x_{i,j}$ of parts to be newly supplied, the $x_{i,j}$ being tentatively determined for each process i. for each day j and stored in the products-in-progress change information storage 2040, for example. The CPU 201 then stores the calculated correction parameters $f_{i,j}$ in the production plan information storage 2031 or the memory 202, for example.

$$f_{i,j} = (1/C_{i,j}) * (((1-B_j) * D_{i,j}) + (X_{i,j} * (B_j/A_j))) \qquad (6)$$

The expression $(1-B_j) * D_{i,j}$ above indicates the parts salvage ratio for each process i on each day j. The expression $x_{i,j} * (B_j/A_j)$ indicates the proportion of nondefective parts newly supplied to each process i on each day j. As can be seen from the above formula (6) and the above expressions, a large change in $B_j$ or $A_j$ results in a large change in the correction parameters $f_{i,j}$.

The product yield $B_j$ is obtained from the final inspection process 106 on each day j and stored in the yield information storage 2034.

Then, at step S93, the CPU 201 newly sets the correction parameter $f_{i,j}$ as $F_{i,j}$ for the process total supply quantity ratio $C_{i,j}$ for each process i for each day j based on upper limit values $\mathrm{Max}\_F_{i,j}$ and lower limit values $\mathrm{Min}\_F_{i,j}$ in accordance to formula (7), and stores the parameter in the production plan information storage 2031 or the memory 202, for example.

$$\mathrm{Max}\_F_{i,j} \geq F_{i,j} \geq \mathrm{Min}\_F_{i,j} \qquad (7)$$

Specifically, if the originally calculated value of the correction parameter $f_{i,j}$ ($F_{i,j}$) is between the upper and lower limit values $\mathrm{Max}\_F_{i,j}$ and $\mathrm{Min}\_F_{i,j}$, the CPU 201 leaves it unchanged. If the value of the correction parameter $F_{i,j}$ is larger than the upper limit value $\mathrm{Max}\_F_{i,j}$, the CPU 201 sets the parameter such that $F_{i,j} = \mathrm{Max}\_F_{i,j}$; if the value is smaller than the lower limit value $\mathrm{Min}\_F_{i,j}$, the CPU 201 sets the parameter such that $F_{i,j} = \mathrm{Min}\_F_{i,j}$. According to the present invention, the maximum and minimum values of the actual process salvage ratios $D_{i,j}$ may be used to determine the upper and lower limit values $\mathrm{Max}\_F_{i,j}$ and $\mathrm{Min}\_F_{i,j}$.

As described above, setting the correction parameters $F_{i,j}$ at between the upper and lower limit values suppresses a large change in the quantities $X_{i,j}$ of parts to be newly supplied calculated in accordance to the above formula (3).

Then, at step S94, the CPU 201 recalculates the quantity $X_{i,j}$ of parts to be newly supplied to each process i on each day j in accordance with the above formula (3) using the above correction parameter $F_{i,j}$ set for each process i for each day j, and stores it in the production plan information storage 2031 or the memory 202, for example.

Then, at step S95, the CPU 201 determines the load on each production process based on the product order quantity $A_j$ for the quantity of parts to be supplied to each process i on each day j (this quantity is the quantity $X_{i,j}$ of parts to be newly supplied to each process i on each day j plus the quantity $Y_{i,j}$ of salvaged parts to be returned to each process i on each day j) stored in, for example, the production plan information storage 2031 or the memory 202.

Figure 10:
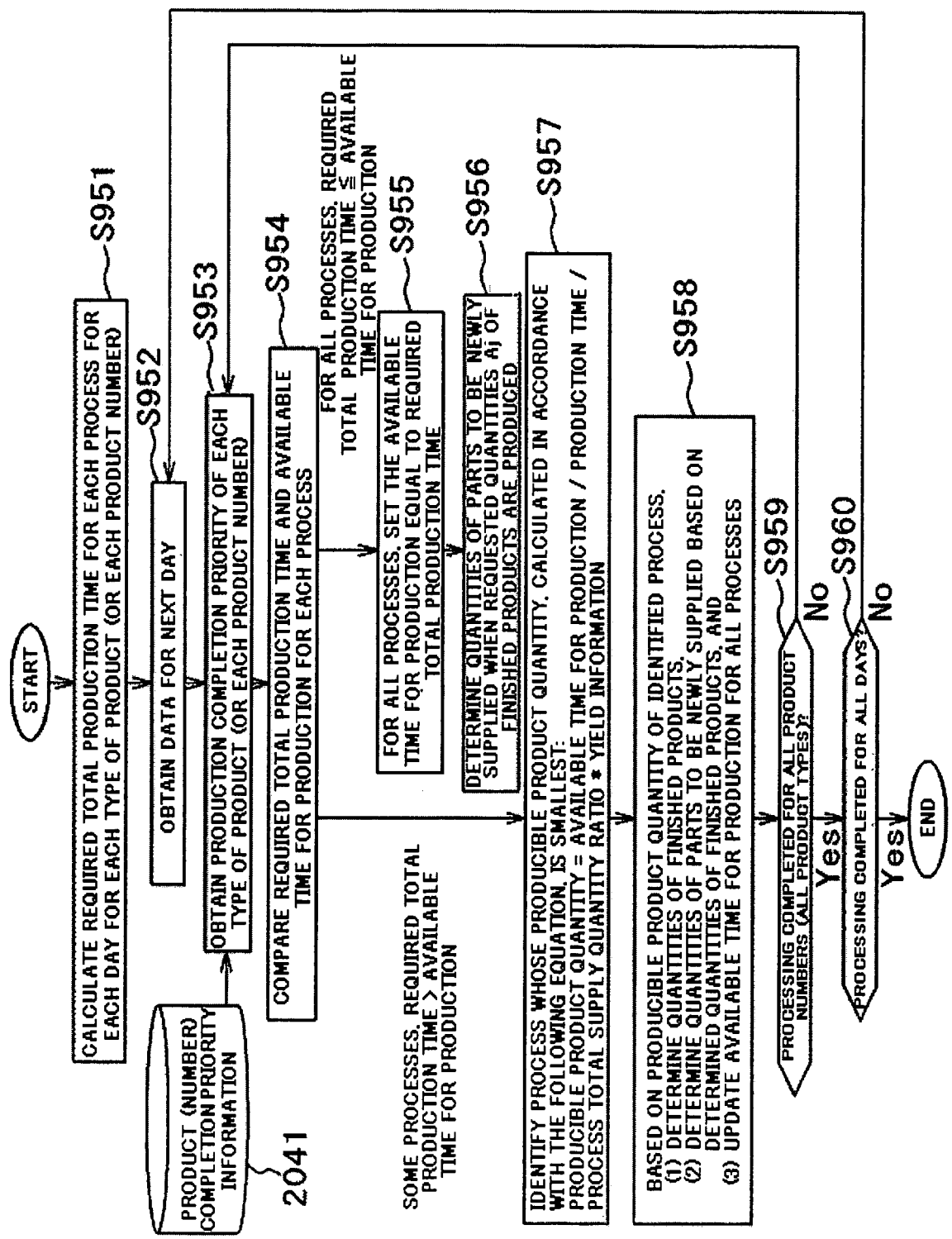
FIG. 10 is a diagram specifically showing the process flow for determining the load on each production process shown in FIG. 9.

With reference to FIG. 10, a description will be given below of a method for determining the load on each production process based on the product order quantities $A_j$ for the quantity of parts to be supplied to each process i on each day j (this quantity is the quantity $X_{i,j}$ of parts to be newly supplied to each process i on each day j plus the quantity $Y_{i,j}$ of salvaged parts to be returned to each process i on each day j) recalculated at steps S91 to S94. This method checks whether there are processes which create bottlenecks in the production line. If so, it is necessary to draft such a production plan that eliminates the bottlenecks, since otherwise unfinished parts or products (stocks) will pile up before such "bottleneck processes," which prevents the required quantity of finished products from being produced.

Specifically, the following processing must be performed. As described above, the production process information storage 2037 stores production process information, which indicates which assembly and subassembly processes and inspection processes are used to produce each type of product (or part or subassembly). This information is supplied to the production line. Further, the production capability master information storage 2038 stores production capability master information $t_{i,j}$, which indicates the production time required for each process to assemble or inspect a single ordered product.

Therefore, based on production process information on each product type k stored in the production process information storage 2037, at step S951 the CPU 201 calculates the required total production time (required production time) $T_{i,j,k}$ for each process i for each day j for each product type (product number) k by multiplying the production time $t_{i,j,k}$ for a single ordered product of each product number k for each process i for each day j by the quantities $(X_{i,j} + Y_{i,j})$ of parts to be supplied, as indicated by formula (8) below. Then, the CPU 201 stores the calculated required total production times $T_{i,j,k}$ in the production plan information storage 2031 or the memory 202, for example.

$$T_{i,j,k} = t_{i,j,k} * (X_{i,j} + Y_{i,j}) \qquad (8)$$

Then, at step S952, the CPU 201 obtains the production times $t_{i,j,k}$ and the quantities $(X_{i,j} + Y_{i,j})$ of parts to be supplied for each day of a given period and calculates the required total production times $T_{i,j,k}$ for each process i for each product type (product number) k. The CPU 201 then stores the calculated total production times $T_{i,j,k}$ in the production plan information storage 2031 or the memory 202, for example.

For example, product number completion priority information storage 2041 in the external storage device 203 stores product number completion priority information, beforehand, received from the production management system (order-receiving system) 210 through the network 209. Therefore, at step S953, the CPU 201 obtains the production completion priority of each product whose production plan is to be drafted over a given period from the product number completion priority information storage 2041, and determines the load on each process of the production line when each product is produced in the order of product completion priority. That is, the CPU 201 calculates the required total production time $T_{i,j,k}$ for each process i for each day j for each product type (product number) k when each product is produced in the above order of product completion priority, and stores it in the production plan information storage 2031 or the memory 202, for example.

Then, at step S954, the CPU 201 compares the required total production time $T_{i,j,k}$ calculated for each process i for each day j for each product type or product number k assuming that each product is produced in the order of product completion priority, and the available time for production, that is, production capability time, $\mathrm{TH}_{i,j}$ for each process i on each day j, the $\mathrm{TH}_{i,j}$ being stored in the available-time-for production information storage 2039 in the external storage device 203, to determine whether there is a process that creates a bottleneck in the production line.

If the required total production time $T_{i,j,k}$ is shorter than the available time for production $\mathrm{TH}_{i,j}$ for all processes, that is, if there is no bottleneck process, then the CPU 201 sets the available time for production $\mathrm{TH}_{i,j}$ equal to the required total production time (or lead time) $T_{i,j,k}$ for all processes (thereby setting the load on each process) at step S955. Then, at step S956, the CPU 201 determines, for each product type, the quantity $X_{i,j}$ of parts to be newly supplied to each process i on each day j when the requested quantity $A_j$ of finished products are produced on each day j. That is, the CPU 201 drafts a production plan based on the production process information on each product type k stored in the production process information storage 2037. The CPU 201 stores the drafted production plan in the production plan information storage 2031.

Figure 13:
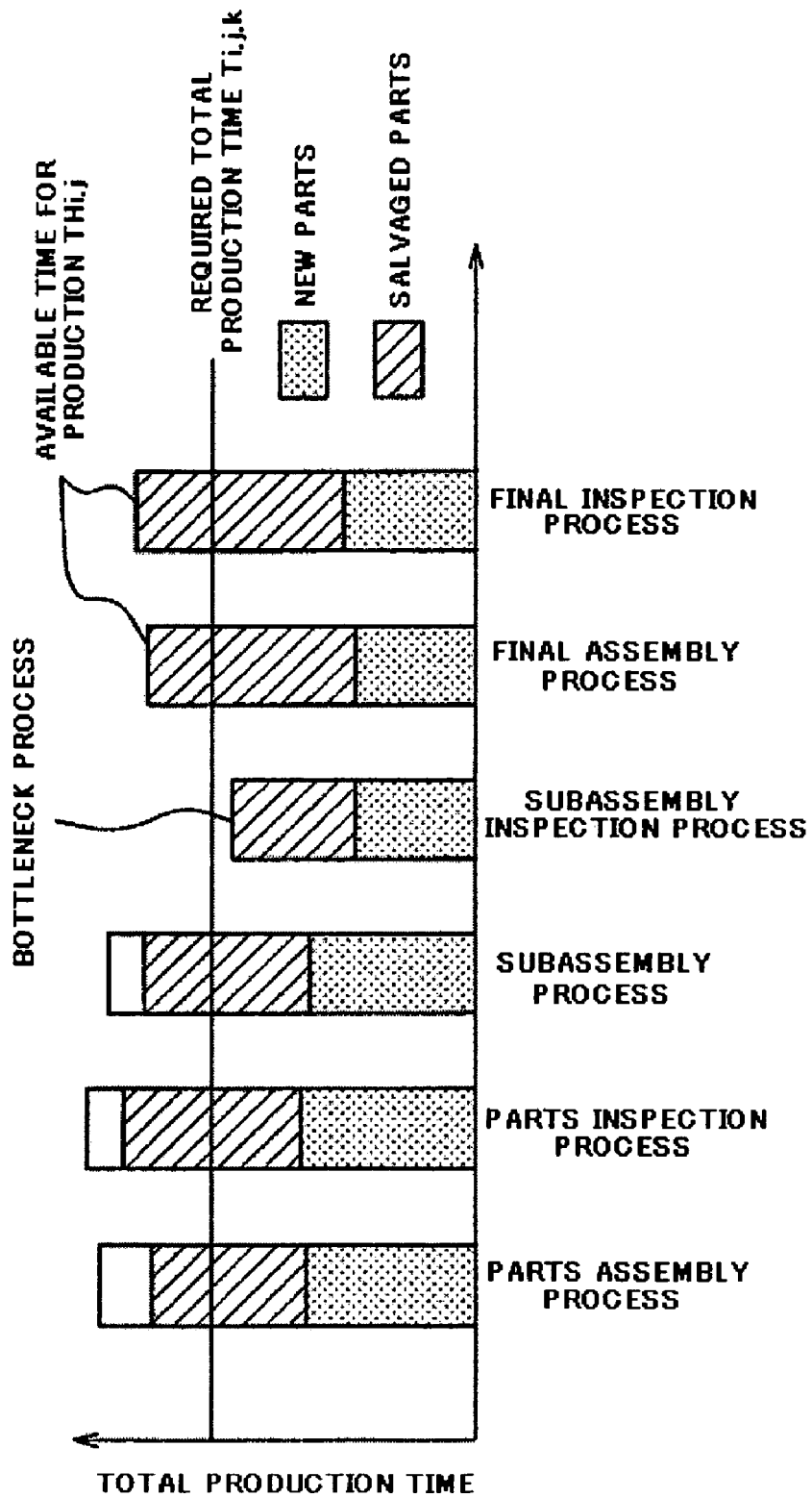
FIG. 13 is a diagram illustrating an example of how to identify a bottleneck process according to the present invention.

On the other hand, if for some process the required total production time $T_{i,j,k}$ exceeds the available time for production $TH_{i,j}$, then such a process creates a bottleneck, as shown in FIG. 13. It should be noted that FIG. 13 assumes that the required total production times $T_{i,j,k}$ of all processes have the same value though in reality they may have different values. If there are bottleneck processes, as described above, the CPU 201 identifies one js whose producible product quantity $a_j$ obtained in accordance with formula (9) is smallest at step S957.

$$a_j = (TH_{i,j}/t_{i,j,k}/C_{i,j})*B_j = (TH_{i,j}*(X_{i,j}+Y_{i,j})/T_{i,j,k}/C_{i,j})*B_j \quad (9)$$

Then, at step S958, based on the producible product quantity $a_j$ for the identified bottleneck process js, the CPU 201 (1) determines the quantities $A_j$ of finished products, (2) determines the quantities $X_{i,j}$ of parts to be newly supplied based on the determined quantities $A_j$ of finished products in accordance with the above formula (3), and (3) updates the available time for production for all processes based on the determined quantities $X_{i,j}$ of parts to be newly supplied. Thus, at step S958, the CPU 201 drafts a production plan based on the production process information on each product k stored in the production process information 2037 and stores the drafted production plan in the production plan information storage 2031. It should be noted that if there is a bottleneck process, a production plan may be drafted so as to increase the available time for production for the bottleneck process. This allows the CPU to directly determine the load on each production process and thereby determine the quantities $A_j$ of finished products and the quantities $X_{i,j}$ of parts to be newly supplied.

Steps S953 to S958 are repeated for each product type until it is determined at step S959 that all product types (all product numbers) have been processed. Then, the date is incremented at step S952, and steps S953 to S958 are repeated for each product type again. This continues until it is determined at step S960 that processing has been completed for all days of the given period for the production plan.

As described above, if there is a production process that creates a bottleneck in the production line, the present invention determines the quantities of parts to be newly supplied based on the producible product quantities and the estimated quantities of stock for the bottleneck process, allowing a new parts supply plan to each production process to be drafted.

Figure 11:
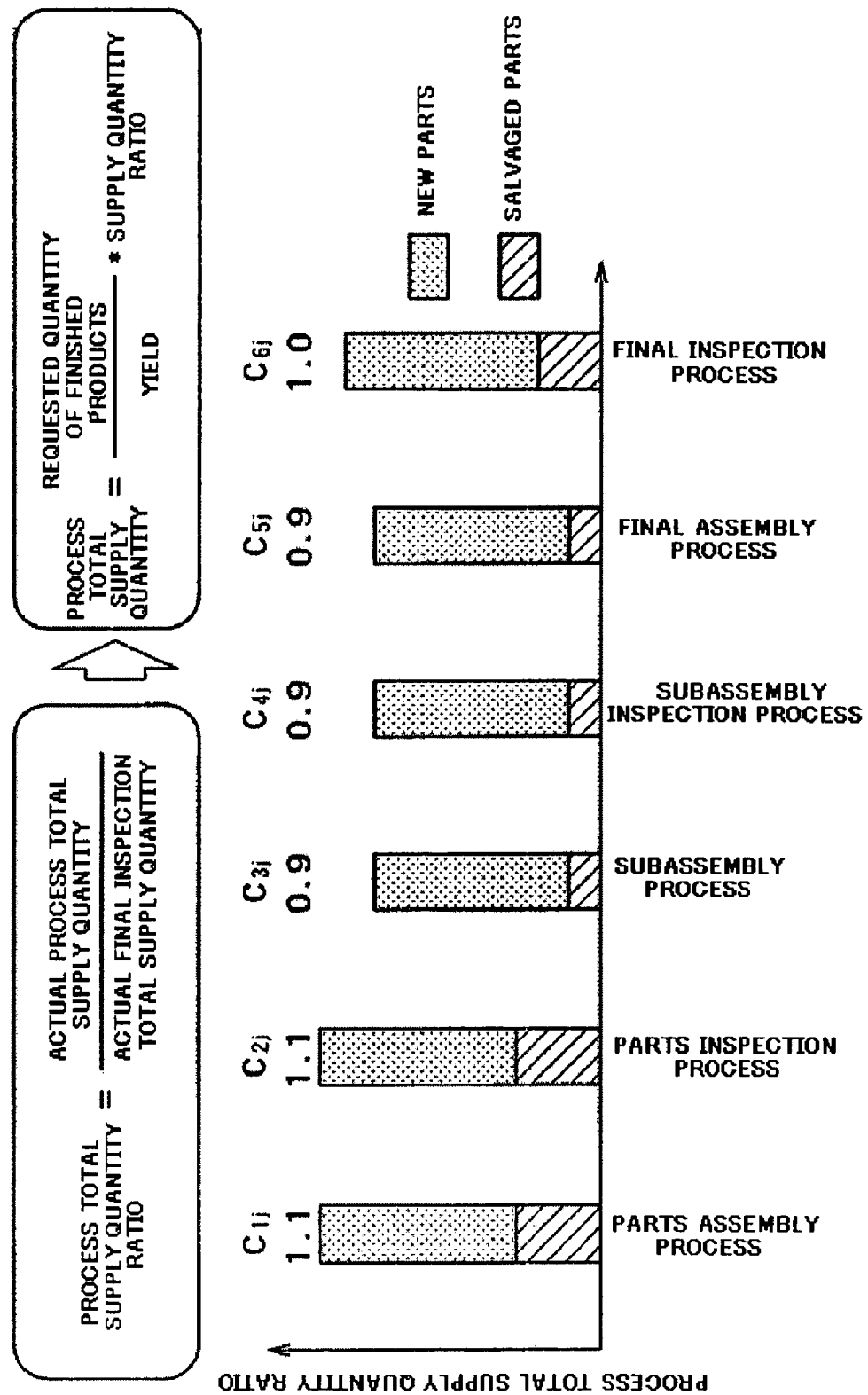
FIG. 11 is a diagram illustrating the process total supply quantity ratio according to the present invention.

It should be noted that the production plan information storage 2031 in the external storage device 203 stores information on production plans drafted for given periods. Each record in the production plan information includes fields such as a product number, a process name, a date for production work, and the quantity of parts to be newly supplied. In this case, the product number field stores the product number (product type) of final assemblies, that is, a production plan is drafted for each product type. This information constitutes the output information from the production planning system, and may be output to the output device 206, a display, etc., or supplied to the production line management system 212 or the production management system 210 through the network 209. In either case, the production plan information and one of the actual process total supply quantity ratio information $C_{i,j}$ shown in FIG. 11, the actual process salvage ration information $D_{i,j}$, and the process load conditions (the relationship between the available time for production and the required total production time) shown in FIG. 13 may be output to a display screen with a scroll function, etc.

Figure 14:
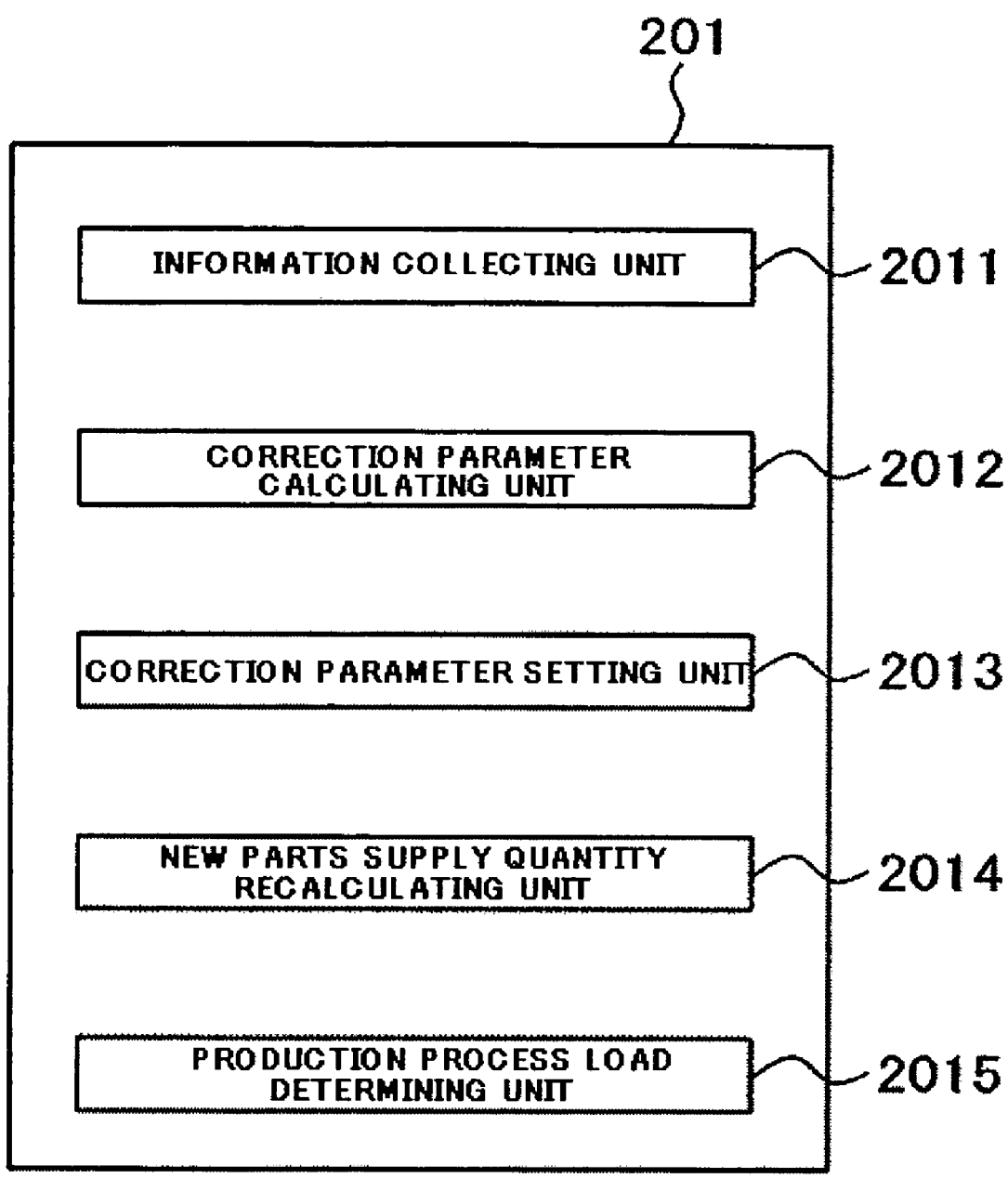
FIG. 14 is a diagram showing an exemplary configuration of the processing program executed by the CPU in the production planning system according to the present invention.

A description will be given below about the processing program executed by the CPU 201 in the production planning system according to the present invention with reference to FIG. 14. According to the present invention, there is provided a system for drafting a production plan for a production line for a given period by use of a computer, the production line including a plurality of production processes and a salvage process, the system comprising: an information collecting unit 2011 for collecting yield information $B_j$ on products previously produced by the production line on each day j and obtaining an actual total supply quantity ratio $C_{i,j}$ and an actual salvage ratio $D_{i,j}$ for each production process i on each day j, the yield information $B_j$, the actual total supply quantity ratio $C_{i,j}$, and the actual salvage ratio $D_{i,j}$ being used to establish a salvage process calculation model; a correction parameter calculating unit 2012 for calculating a correction parameter $f_{i,j}$ for the actual total supply quantity ratio $C_{i,j}$ for each production process i for each day j in such a way that the requested quantity $A_j$ of finished products can be produced by the production line on each day j and furthermore an appropriate quantity $OW_{i,j}$ of stock can be obtained for each production process i on each day j, the actual total supply quantity ratio $C_{i,j}$ being obtained by the information collecting unit 2011; a correction parameter setting unit 2013 for setting the correction parameter $f_{i,j}$ at between upper and lower limit values, the correction parameter $f_{i,j}$ being calculated for each production process i for each day j by the correction parameter calculating unit 2012; a new parts supply quantity recalculating unit 2014 for, in accordance with the above formula (3), recalculating the quantity $X_{i,j}$ of parts to be newly supplied to each production process i on each day j based on the product yield (information) $B_j$ on each day j, the actual total supply quantity ratio $C_{i,j}$ for each production process i on each day j, the actual salvage ratio $D_{i,j}$ for each production process i on each day j, the requested quantity $A_j$ of finished products on each day j, and a correction parameter $F_{i,j}$ for each production process i on each day j obtained from the correction parameter $f_{i,j}$ for each production process i on each day j set by the correction parameter setting unit 2013, the product yield information $B_j$, the actual total supply quantity ratio $C_{i,j}$, and the actual salvage ratio $D_{i,j}$ being obtained by the information collecting unit 2011, the correction parameter $F_{i,j}$ being set between the upper and lower limit values; and a production process load determining unit 2015 for, to draft the production plan for the given period, determining the load on each production process of the production line based on the quantity $X_{i,j}$ of parts to be newly supplied to each production process i on each day j, the quantity $X_{i,j}$ being recalculated by the new parts supply quantity recalculating unit 2014.

Further according to the present invention, the production process load determining unit 2015 performs steps of: if there is a production process that creates a bottleneck in the production line, determining the quantity of products producible on each day j when the bottleneck production process is used; determining the quantity of parts to be newly supplied to each production process i on each day j based on the determined quantity of products producible on each day j; and determining the load on each production process of the production line based on the determined quantity of parts to be newly supplied to each production process i on each day j.

Still further according to the present invention, the correction parameter calculating unit 2012 performs steps of: tentatively determining the quantity $x_{i,j}$ of parts to be newly supplied to each production process i on each day j in such a way that the appropriate quantity $OW_{i,j}$ of stock can be obtained for each production process i on each day j; and calculating the correction parameter $f_{i,j}$ for each production process i for each day j based on the tentatively determined quantity $x_{i,j}$ of parts to be newly supplied to each production process i on each day j in accordance to the above formula (6).

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method for drafting a production plan for a production line for a given period by use of a computer, said production line including a plurality of production processes and a salvage process, said salvage process disassembling products found to be defective in said production processes and returning salvaged parts to said production processes, said method comprising:

an information collecting step of collecting yield information $B_j$ on products previously produced by said production line on each day j and obtaining an actual total supply quantity ratio $C_{i,j}$ and an actual salvage ratio $D_{i,j}$ for each production process i on each day j, said yield information $B_j$, said actual total supply quantity ratio $C_{i,j}$, and said actual salvage ratio $D_{i,j}$ being used to establish a salvage process calculation model;

a new parts supply quantity recalculating step of recalculating the quantity $X_{i,j}$ of parts to be newly supplied to each production process i on each day j based on said product yield information $B_j$ on each day j, said actual total supply quantity ratio $C_{i,j}$ for each production process i on each day j, said actual salvage ratio $D_{i,j}$ for each production process i on each day j, the requested quantity $A_j$ of finished products on each day j, and a correction parameter $F_{i,j}$ for said actual total supply quantity ratio $C_{i,j}$ for each production process i on each day j, said product yield information $B_j$, said actual total supply quantity ratio $C_{i,j}$, and said actual salvage ratio $D_{i,j}$ being obtained at said information collecting step; and a production process load determining step of, to draft said production plan for said given period, determining the load on each production process of said production line based on said quantity $X_{i,j}$ of parts to be newly supplied to each process i on each day j in such a way that said requested quantity $A_j$ of finished products can be produced on each day j, said quantity $X_{i,j}$ being recalculated at said new parts supply quantity recalculating step.

2. The method as claimed in claim 1, wherein said production process load determining step includes:

if there is a production process that creates a bottleneck in said production line, determining the quantity of products producible on each day j when said bottleneck production process is used;

determining the quantity of parts to be newly supplied to each production process i on each day j based on said determined quantity of products producible on each day j; and determining the load on each production process of said production line based on said determined quantity of parts to be newly supplied to each production process i on each day j.

3. A method for drafting a production plan for a production line for a given period by use of a computer, said production line including a plurality of production processes and a salvage process, said salvage process disassembling products found to be defective in said production processes and returning salvaged parts to said production processes, said method comprising:

an information collecting step of collecting yield information $B_j$ on products previously produced by said production line on each day j and obtaining an actual total supply quantity ratio $C_{i,j}$ and an actual salvage ratio $D_{i,j}$ for each production process i on each day j, said yield information $B_j$, said actual total supply quantity ratio $C_{i,j}$ and said actual salvage ratio $D_{i,j}$ being used to establish a salvage process calculation model;

a correction parameter calculating step of calculating a correction parameter $f_{i,j}$ for said actual total supply quantity ratio $C_{i,j}$ for each production process i for each day j in such a way that the requested quantity $A_j$ of finished products can be produced by said production line on each day j and furthermore an appropriate quantity $OW_{i,j}$ of stock can be obtained for each production process i on each day j, said actual total supply quantity ratio $C_{i,j}$ being obtained at said information collecting step;

a new parts supply quantity recalculating step of recalculating step of recalculating the quantity $X_{i,j}$ of parts to be newly supplied to each production process i on each day j based on said product yield information $B_j$ on each day j, said actual total supply quantity ratio $C_{i,j}$ for each production process i on each day j, said actual salvage ration $D_{i,j}$ for each production process i on each day j, said requested quantity $A_j$ of finished products on each day j, and a correction parameter $F_{i,j}$ for each production process i on each day j obtained from said correction parameter $f_{i,j}$ for each production process i on each day j calculated at said correction parameter calculating step, said product yield information $B_j$, said actual total supply quantity ratio $C_{i,j}$, and said actual salvage ration $D_{i,j}$ being obtained at said information collection step, said correction parameter $F_{i,j}$ being set between upper and lower limit values; and a production process load determining step of, to draft said production plan for said given period, determining the load on each production process of said production line based on said quantity $X_{i,j}$ of parts to be newly supplied to each process i on each day j in such a way that said requested quantity $A_j$ of finished products can be produced on each day j, said quantity $X_{i,j}$ being recalculated at said new parts supply quantity recalculating step.

4. The method as claimed in claim 3, wherein said production process load determining step includes:

if there is a production process that creates a bottleneck in said production line, determining the quantity of products producible on each day j when said bottleneck production process is used;

determining the quantity of parts to be newly supplied to each production process i on each day j based on said determined quantity of products producible on each day j; and determining the load on each production process of said production line based on said determined quantity of parts to be newly supplied to each production process i on each day j.

5. A method for drafting a production plan for a production line for a given period by use of a computer, said production line including a plurality of production processes and a salvage process, said salvage process disassembling products found to be defective in said production processes and returning salvaged parts to said production processes, said method comprising:

an information collecting step of collecting yield information $B_j$ on products previously produced by said production line on each day j and obtaining an actual total supply quantity ratio $C_{i,j}$ and an actual salvage ratio $D_{i,j}$ for each production process i on each day j, said yield information $B_j$, said actual total supply quantity ratio $C_{i,j}$, and said actual salvage ratio $D_{i,j}$ being used to establish a salvage process calculation model;

a correction parameter calculating step of calculating a correction parameter $f_{i,j}$ for said actual total supply quantity ratio $C_{i,j}$ for each production process i for each day j in such a way that the requested quantity $A_j$ of finished products can be produced by said production line on each day j and furthermore an appropriate quantity $OW_{i,j}$ of stock can be obtained for each production process i on each day j, said actual total supply quantity ratio $C_{i,j}$ being obtained at said information collecting step;

a correction parameter setting step of setting said correction parameter $f_{i,j}$ at between upper and lower limit values, said correction parameter $f_{i,j}$ being calculated for each production process i for each day j at said correction parameter calculating step;

a new parts supply quantity recalculating step of recalculating step of, in accordance with the equation $X_{i,j} = ((F_{i,j} * C_{i,j}) - ((1-B_j) * D_{i,j})) * (A_j/B_j)$, recalculating the quantity $X_{i,j}$ of parts to be newly supplied to each production process i on each day j based on said product yield information $B_j$ on each day j, said actual total supply quantity ratio $C_{i,j}$ for each production process i on each day j, said actual salvage ration $D_{i,j}$ for each production process i on each day j set at said correction parameter setting step, said product yield information $B_j$, said actual the quantity $X_{i,j}$ of parts to be newly supplied to each production process i on each day j based on said product yield information $B_j$ on each day j, said actual total supply quantity ratio $C_{i,j}$ for each production process i on each day j, said actual salvage ratio $D_{i,j}$ for each production process i on each day j, said requested quantity $A_j$ of finished products on each day j, and a correction parameter $F_{i,j}$ for each production process i on each day j obtained from said correction parameter $f_{i,j}$ for each production process i on each day j calculated at said correction parameter calculating step, said product yield information $B_j$, said actual total supply quantity ratio $C_{i,j}$, and said actual salvage ratio $D_{i,j}$ being obtained at said information collecting step, said correction parameter $F_{i,j}$ being set between upper and lower limit values; and a production process load determining step of, to draft said production plan for said given period, determining the load on each production process of said production line based on said quantity $X_{i,j}$ of parts to be newly supplied to each production process i on each day j in such a way that said requested quantity $A_j$ of finished products can be produced on each day j, said quantity $X_{i,j}$ being recalculated at said new parts supply quantity recalculating step.

6. The method as claimed in claim 5, wherein said production process load determining step includes:

if there is a production process that creates a bottleneck in said production line, determining the quantity of products producible on each day j when said bottleneck production process is used;

determining the quantity of parts to be newly supplied to each production process i on each day j based on said determined quantity of products producible on each day j; and determining the load on each production process of said production line based on said determined quantity of parts to be newly supplied to each production process i on each day j.

7. The method as claimed in claim 5, wherein said correction parameter calculating step includes:

tentatively determining the quantity $x_{i,j}$ of parts to be newly supplied to each production process i on each day j in such a way that said appropriate quantity $OW_{i,j}$ of stock can be obtained for each process i on each day j; and calculating said correction parameter $f_{i,j}$ for each production process i for each day j based on the tentatively determined quantity $x_{i,j}$ of parts to be newly supplied to each production process i on each day j in accordance with the following equation:

$$f_{i,j} = (1/C_{i,j}) * (((1-B_j) * D_{i,j}) + (X_{i,j} * (B_j/A_j))).$$

8. A system for drafting a production plan for a production line for a given period by use of a computer, said production line including a plurality of production processes and a salvage process, said salvage process disassembling products found to be defective in said production processes and returning salvaged parts to said production processes, said system comprising:

an information collecting unit for collecting yield information $B_j$ on products previously produced by said production line on each day j and obtaining an actual total supply quantity ratio $C_{i,j}$ and an actual salvage ratio $D_{i,j}$ for each production process i on each day j, said yield information $B_j$, said actual total supply quantity ratio $C_{i,j}$, and said actual salvage ratio $D_{i,j}$ being used to establish a salvage process calculation model;

a new parts supply quantity recalculating unit for recalculating the quantity $X_{i,j}$ of parts to be newly supplied to each production process i on each day j based on said product yield information $B_j$ on each day j, said actual total supply quantity ratio $C_{i,j}$ for each production process i on each day j, said actual salvage ratio $D_{i,j}$ for each production process i on each day j, the requested quantity $A_j$ of finished products on each day j, and a correction parameter $F_{i,j}$ for said actual total supply quantity ratio $C_{i,j}$ for each production process i on each day j, said product yield information $B_j$, said actual total supply quantity ratio $C_{i,j}$, and said actual salvage ratio $D_{i,j}$ being obtained by said information collecting unit; and a production process load determining unit for, to draft said production plan for said given period, determining the load on each production process of said production line based on said quantity $X_{i,j}$ of parts to be newly supplied to each production process i on each day j in such a way that said requested quantity $A_j$ of finished products can be produced on each day j, said quantity $X_{i,j}$ being recalculated by said new parts supply quantity recalculating unit.

9. The system as claimed in claim 8, wherein said production process load determining unit performs steps of:
if there is a production process that creates a bottleneck in said production line, determining the quantity of products producible on each day j when said bottleneck production process is used;
determining the quantity of parts to be newly supplied to each production process i on each day j based on said determined quantity of products producible on each day j; and
determining the load on each production process of said production line based on said determined quantity of parts to be newly supplied to each production process i on each day j.

10. A system for drafting a production plan for a production line for a give period by use of a computer, said production line including a plurality of production processes and a salvage process, said salvage process disassembling products found to be defective in said production processes and returning salvaged parts to said production processes, said system comprising:
an information collecting unit for collecting yield information $B_j$ on products previously produced by said production line on each day j and obtaining an actual total supply quantity ratio $C_{i,j}$ and an actual salvage ratio $D_{i,j}$ for each production process i on each day j, said yield information $B_j$, said actual total supply quantity ratio $C_{i,j}$, and said actual salvage ratio $D_{i,j}$ being used to establish a salvage process calculation model;
a correction parameter calculating unit for calculating a correction parameter $f_{i,j}$ for said actual total supply quantity ratio $C_{i,j}$ for each production process i for each day j in such a way that the requested quantity $A_j$ of finished products can be produced by said production line on each day j and furthermore an appropriate quantity $OW_{i,j}$ of stock can be obtained for each production process i on each day j, said actual total supply quantity ratio $C_{i,j}$ being obtained by said information collecting unit;
a new parts supply quantity recalculating unit for recalculating the quantity $X_{i,j}$ of parts to be newly supplied to each production process i on each day j based on said product yield information $B_j$ on each day j, said actual total supply quantity ratio $C_{i,j}$ for each production process i on each day j, said actual salvage ratio $D_{i,j}$ for each production process i on each day j, said requested quantity $A_j$ of finished products on each day j, and a correction parameter $F_{i,j}$ for each production process i on each day j obtained from said correction parameter $f_{i,j}$ for each production process i on each day j calculated by said correction parameter calculating unit, said product yield information $B_j$, said actual total supply quantity ratio $C_{i,j}$, and said actual salvage ratio $D_{i,j}$ being obtained by said information collecting unit, said correction parameter $F_{i,j}$ being set between upper and lower limit values; and a production process load determining unit for, to draft said production plan for said given period, determining the load on each production process of said production line based on said quantity $X_{i,j}$ of parts to be newly supplied to each production process i on each day in such a way that said requested quantity $A_j$ of finished products can be produced on each day j, said quantity $X_{i,j}$ being recalculated by said new parts supply quantity recalculating unit.

11. The system as claimed in claim 10, wherein said production process load determining unit performs steps of:
if there is a production process that creates a bottleneck in said production line, determining the quantity of products producible on each day j when said bottleneck production process is used;
determining the quantity of parts to be newly supplied to each production process i on each day j based on said determined quantity of products producible on each day j; and
determining the load on each production process of said production line based on said determined quantity of parts to be newly supplied to each production process i on each day j.

12. A system for drafting a production plan for a production line for a given period by use of a computer, said production line including a plurality of production processes and a salvage process, said salvage process disassembling products found to be defective in said production processes and returning salvaged parts to said production processes, said system comprising:
an information collecting unit for collecting yield information $B_j$ on products previously produced by said production line on each day j and obtaining an actual total supply quantity ratio $C_{i,j}$ and an actual salvage ratio $D_{i,j}$ for each production process i on each day j, said yield information $B_j$, said actual total supply quantity ratio $C_{i,j}$, and said actual salvage ratio $D_{i,j}$ being used to establish a salvage process calculation model;
a correction parameter calculating unit for calculating a correction parameter $f_{i,j}$ for said actual total supply quantity ratio $C_{i,j}$ for each production process i for each day j in such a way that the requested quantity $A_j$ of finished products can be produced by said production line on each day j and furthermore an appropriate quantity $OW_{i,j}$ of stock can be obtained for each production process i on each day j, said actual total supply quantity ratio $C_{i,j}$ being obtained by said information collecting unit;
a correction parameter setting unit for setting said correction parameter $f_{i,j}$ at between upper and lower limit values, said correction parameter $f_{i,j}$ being calculated for each production process i for each day j by said correction parameter calculating unit;
a new parts supply quantity recalculating unit for, in accordance with the equation $X_{i,j}=(F_{i,j}*C_{i,j})-((1-B_j)*D_{i,j})*(A_j/B_j)$, recalculating the quantity $X_{i,j}$ of parts to be newly supplied to each production process i on each day j based on said product yield information $B_j$ on each day j, said actual total supply quantity ratio $C_{i,j}$ for each production process i on each day j, said actual salvage ratio $D_{i,j}$ for each production process i on each day j, said requested quantity $A_j$ of finished products on each day j, and a correction parameter $F_{i,j}$ for each production process i on each day j obtained from said correction parameter $f_{i,j}$ for each production process i on each day j set by said correction parameter setting unit, said product yield information $B_j$, said actual total supply quantity ratio $C_{i,j}$, and said actual salvage ratio $D_{i,j}$ being obtained by said information collecting unit, said correction parameter $F_{i,j}$ being set between said upper and lower limit values; and a production process load determining unit for, to draft said production plan for said given period, determining the load on each production process of said production line based on said quantity $X_{i,j}$ of parts to be newly supplied to each production process i on each day j, said quantity $X_{i,j}$ being recalculated by said new parts supply quantity recalculating unit.

13. The system as claimed in claim 12, wherein said production process load determining unit performs steps of:

if there is a production process that creates a bottleneck in said production line, determining the quantity of products producible on each day j when said bottleneck production process is used;

determining the quantity of parts to be newly supplied to each production process i on each day j based on said determined quantity of products producible on each day j; and determining the load on each production process of said production line based on said determined quantity of parts to be newly supplied to each production process i on each day j.

14. The system as claimed in claim 12, wherein said correction parameter calculating unit performs steps of:

tentatively determining the quantity $x_{i,j}$ of parts to be newly supplied to each production process i on each day j in such a way that said appropriate quantity $OW_{i,j}$ of stock can be obtained for each production process i on each day j; and calculating said correction parameter $f_{i,j}$ for each production process i for each day j based on the said tentatively determined quantity $X_{i,j}$ of parts to be newly supplied to each production process i on each day j in accordance to the following equation:

$$f_{i,j}=(1/C_{i,j})*(((1-B_j)*D_{i,j})+(X_{i,j}*(B_j/A_j))).$$

* * * * *